(No Model.)
H. M. BRITTAIN.
EGG BEATER.
No. 472,803. Patented Apr. 12, 1892.
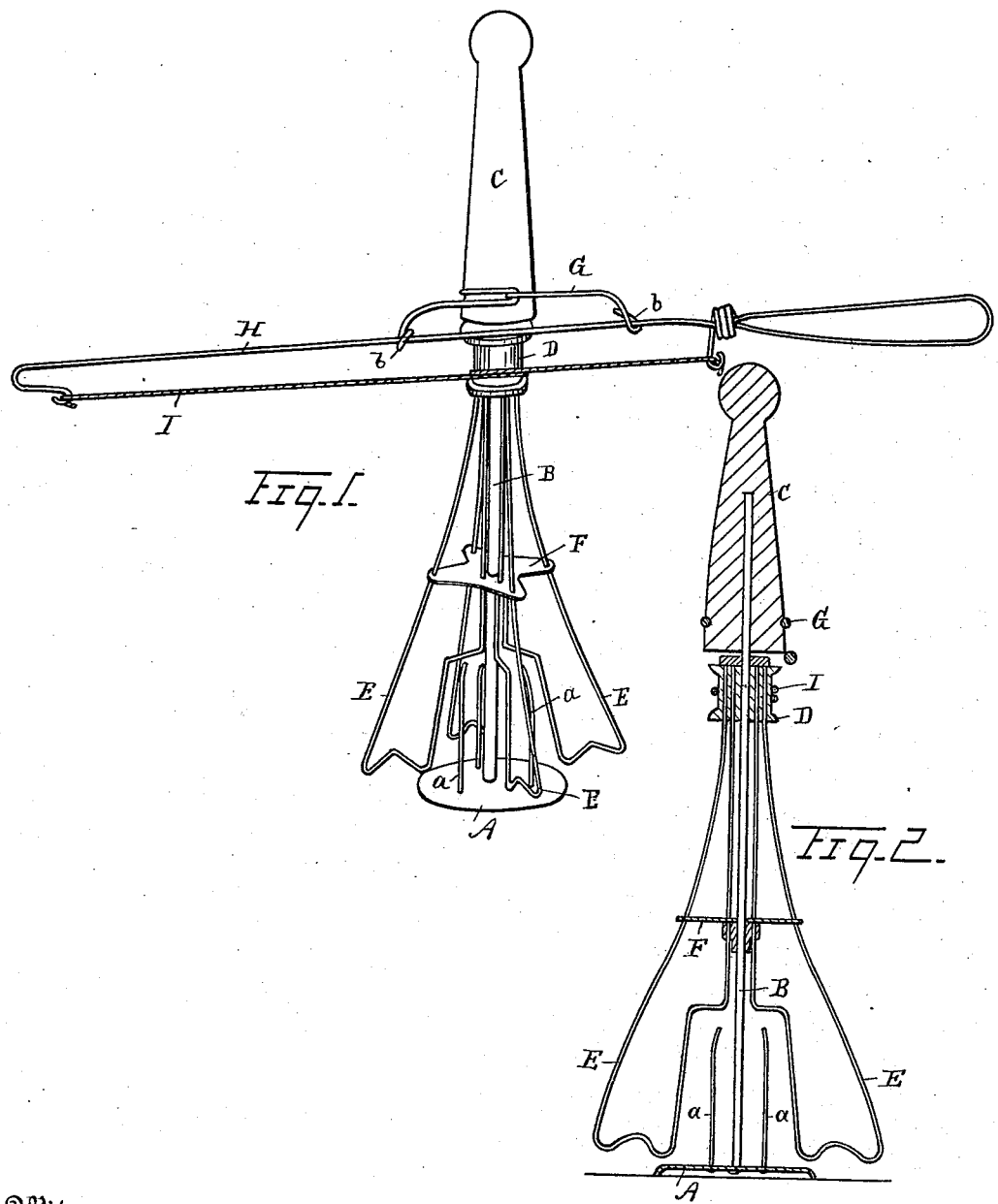
Witnesses
John Schuman.
Anthony Parnet
Inventor
Howard M. Brittain.
By his Attorney
H. F. Eberts.

UNITED STATES PATENT OFFICE.

HOWARD M. BRITTAIN, OF MARTIN'S CREEK, PENNSYLVANIA.

EGG-BEATER.

SPECIFICATION forming part of Letters Patent No. 472,803, dated April 12, 1892.

Application filed May 18, 1891. Serial No. 393,205. (No model.)

*To all whom it may concern:*

Be it known that I, HOWARD M. BRITTAIN, a citizen of the United States, residing at Martin's Creek, in the county of Northampton and State of Pennsylvania, have invented a new and useful Egg-Beater, of which the following is a specification.

My invention relates to improvements in egg-beaters of that class in which a number of wire beater-frames are made to rotate about a standard temporarily resting in the bottom of the receptacle containing the eggs to be beaten.

The object I have in view is to apply the well-known bow-drill movement to a peculiarly-constructed beater, whereby the work can be more easily done and in less time than heretofore. I attain this by the mechanism illustrated in the accompanying drawings, in which—

Figure 1 is a perspective view. Fig. 2 is a central vertical section.

In the drawings, A is a metal base-plate, which rests on the bottom of the vessel containing the eggs.

B is a standard rising therefrom, terminating in a wooden handle C. Four short wire posts $a$ rise from the base-plate and serve as breakers.

D is a spool rotating freely on the standard just below the handle.

E represents one of four or more curved wire beaters starting from the base of the spool, extending down along and near the standard through the spider F to a point above the breakers $a$, thence outwardly and downwardly to the base-plate, thence sinuously outward, thence curving inwardly and upwardly through the arms of the spider to the base of the spool again, it being preferable to make these beaters in one piece, as shown, although their form, construction, and arrangement may be varied without departing from the spirit of my invention.

The rotation of the beater-spool is accomplished in the following manner:

G is a wire guide-frame fastened in a groove near the base of the handle, terminating at each end in a guide-loop $b$.

H is a drill-bow made of wire bent and twisted to the form shown, sliding through the guide-loops $b$ $b$, and I is a catgut bow string having a turn taken around the spool and its ends fastened to the extremities of the drill-bow.

The operation of the device is as follows: The operator, pressing down the handle with one hand, holds the base-plate firmly in the bottom of the egg-vessel, while the other hand grasps the handle of the drill-bow. An easy reciprocation of the latter causes a rapid alternating rotation of the spool and its attached beater-frames.

What I claim as my invention, and desire to secure by Letters Patent, is—

An egg-beater consisting of the base, the standard rising therefrom, the handle having grooves, the spool rotating on the standard, the curved beaters having their ends connected to the spool, the spider, the breakers rising from the base between the standard and beaters, the guide having loops, the bow passing through the loops, and the cord connected to the bow and passing around the spool, as described.

HOWARD M. BRITTAIN.

Witnesses:
WALTER O. LANALL,
GEO. F. KICHLINE.